United States Patent [19]

Kuhl

[11] Patent Number: 4,834,875
[45] Date of Patent: May 30, 1989

[54] TWO STAGE LIQUID FILTRATON APPARATUS

[76] Inventor: Henry Y. Kuhl, Kuhl Rd., P.O. Box 26, Flemington, N.J. 08822-0026

[21] Appl. No.: 179,823

[22] Filed: Apr. 11, 1988

[51] Int. Cl.$^4$ .............................................. B01D 33/06
[52] U.S. Cl. ................................. 210/181; 210/257.1; 210/259; 210/297; 210/404; 210/195.1
[58] Field of Search ..................... 210/181, 182, 195.1, 210/257.1, 259, 297, 298, 299, 304, 310, 313, 391, 396, 404, DIG. 5; 209/264, 273

[56] References Cited

U.S. PATENT DOCUMENTS

| | | | |
|---|---|---|---|
| 3,341,016 | 9/1967 | Paasche | 210/801 |
| 3,698,949 | 10/1972 | Steppe et al. | 127/9 |
| 3,807,568 | 4/1974 | Ruthrof | 210/304 |
| 3,875,063 | 4/1975 | Treplin et al. | 210/304 |
| 3,907,686 | 9/1975 | Fletcher et al. | 210/304 |
| 3,929,639 | 12/1975 | Turner et al. | 210/304 |
| 4,113,626 | 9/1978 | Detcher | 210/409 |
| 4,120,790 | 10/1978 | Tinker et al. | 210/767 |
| 4,251,356 | 2/1981 | Harte | 209/250 |
| 4,252,641 | 2/1981 | Martin | 209/273 |
| 4,253,955 | 3/1981 | Kline | 210/172 |
| 4,309,284 | 1/1982 | Morimoto et al. | 209/273 |
| 4,334,986 | 6/1982 | Frykhult | 209/17 |
| 4,512,880 | 4/1983 | Connolly | 209/250 |
| 4,571,301 | 2/1986 | Inskeep, Jr. | 210/304 |
| 4,673,500 | 6/1987 | Hoofnagle et al. | 210/313 |
| 4,747,961 | 5/1988 | Beer et al. | 210/297 |

FOREIGN PATENT DOCUMENTS 1002819 9/1965 United Kingdom ................ 210/297

Primary Examiner—Richard V. Fisher
Assistant Examiner—Joseph W. Drodge
Attorney, Agent, or Firm—Sperry, Zoda & Kane

[57] ABSTRACT

A two stage liquid filtration apparatus including a first pre-filter stage for removing heavy small particulate contaminants from the liquid with a first housing defining an inlet and an outlet and a screening means dividing a central chamber therethrough to allow contaminants like sand to fall downwardly therefrom for pre-filtration thereof. The liquid is then carried to a second stage filter which is a rotary filtration means for further removing contaminants through a rotatable cylinder with internal baffles for discharging the waste at one end of the cylinder and discharging the filtered water downwardly about the periphery of the cylinder. The cylinder is formed of a filtration media. A liquid reservoir is positioned below the cylindrical filter which includes a tank means for receiving filtered liquid and a heating means for controlling the temperature thereof. An outlet is defined in the tank for interconnecting with respect to a return line for re-supplying the filtered liquid for further usage thereof. A deflector plate is included in the upper portion of the tank to receive the downwardly moving filtered liquid. The deflector plate extends below the level of the liquid for localizing of any floating contaminants or surface foam.

14 Claims, 3 Drawing Sheets

TWO STAGE LIQUID FILTRATON APPARATUS

BACKGROUND OF THE INVENTION

1. Field Of The Invention

The present invention deals with the field of devices for multi stage filtration of liquid media. The present invention is particularly useful for the filtration of cleaning liquid utilized for various types of cleaning operations. The present invention is even further particularly adaptable for usage with the filtration of cleansing liquid used for cleaning poultry cages, eggs, and egg handling baskets wherein a large amount of sand is included as debris. The present invention provides a method for the removal in a pre-filtering step of the sandtype contaminants to facilitate efficient filtration by a rotary filtration system.

2. Description Of The Prior Art

Examples of prior art configurations are shown in U.S. Pat. No. 3,341,016 patented Sept. 12, 1967 to J. Paasche on a Spray Booth (Self-Cleaning); U.S. Pat. No. 3,698,949 patented Oct. 17, 1972 to K. Steppe et al on an Apparatus For Removing Rock From Unscreened Sugar Can Juice; U.S. Pat. No. 3,807,568 patented Apr. 30, 1974 to K. Ruthrof on a Device For Separating Solids And Other Foreign Bodies From Liquids; U.S. Pat. No. 3,875,063 patented Apr. 1, 1975 to F. Treplin et al on a Filter Screening Device; U.S. Pat. No. 4,113,626 patented Sept. 12, 1978 to T. Detcher on a Dewatering Screen; U.S. Pat. No. 4,120,790 patented Oct. 17, 1978 to D. Tinker et al on a Synthetic Rubber Dewatering Apparatus And Method U.S. Pat. No. 4,251,356 patented Feb. 17, 1981 to H. Harte on an Apparatus For Classifying The Constituents Of A Pneumatically Conveyed Tobacco-Containing Stream; U.S. Pat. No. 4,252,641 patented Feb. 24, 1981 to A. Martin on a Pressurized Screen; U.S. Pat. No. 4,253,955 patented Mar. 3, 1981 to R. Kline on Liquid-Solids Separator; U.S. Pat. No. 4,309,284 patented Jan. 5, 1982 to K. Morimoto et al on a Screen Device For Paper Material; U.S. Pat. No. 4,334,986 patented June 15, 1982 to R. Frykhult on a Separator For A Mixture Of A Suspension And Coarse Heavy Particles; and U.S. Pat. No. 4,512,880 patented Apr. 23, 1985 to J. Connolly on a Method Of Removing Slimes From Slurries.

SUMMARY OF THE INVENTION

The present invention provides a two stage liquid filtration apparatus including a first stage filtration device which is adapted to pre-filter heavier particulate contaminants such as sand or the like from the liquid. This first stage filtration device includes a first housing defining a first filtration chamber therein adapted to retain the heavier particulate contaminants.

A first inlet and a first outlet is defined in the housing means. A first liquid flow path is defined between the first inlet and the first outlet by the first housing means. This first housing preferably defines the axis of the first inlet and the axis of the first outlet such as to be perpendicular with respect to one another. In this manner the first liquid flow path will be defined to pass through a 90 degree angle therebetween. To facilitate this guiding the first housing may include a concave arcuate outer guide plate and a convex arcuate inner guide plate to facilitate guiding of the liquid along this 90 degree turn in the flow path.

The first housing preferably defines a plurality of lower retainment walls therein positioned below the first liquid flow path which are inclined inwardly with respect to one another to define a contaminant retainment chamber therebetween.

A screen filtration means extends horizontally laterally through the first filtration chamber to define the liquid flow path thereabove and to define a lower retainment chamber therebelow. The screen member allows limited fluid flow communication between the liquid flow path and the lower retainment chamber to thereby allow heavier particular contaminants such as sand and the like which is smaller than a predetermined size and above a predetermined weight to pass downwardly therethrough and be removed from the liquid moving along the first liquid flow path. In this manner these heavier and smaller contaminants will be retained within the lower retainment chamber positioned therebelow.

A first waste outlet is in fluid flow communication with respect to the lower retainment chamber and is selectively openable to periodically release retained particular contaminants from the contaminant retainment chamber as desired. To facilitate this removal a release valve may be located immediately below the contaminant containment chamber to facilitate this periodic release.

An interstage conduit is in fluid flow communication with respect to the first outlet and is adapted to receive pre-filtered liquid therefrom for movement to the second inlet defined in a second stage filtration device.

The second stage filtration device includes a second housing defining a second filtration chamber therein adapted to further remove contaminants from the prefiltered liquid. A second liquid flow path is defined extending through the second housing between the second inlet and the second outlet defined therein.

A rotary filtration means is positioned in fluid flow communication with respect to the second inlet means to receive pre-filtered liquid therefrom for further filtration thereof. This rotary filtration means defines a waste outlet and a filtered liquid outlet. The filtered liquid outlet is in fluid flow communication with respect to the second outlet means.

The rotary filtration means further particularly includes a generally cylindrical rotatable member oriented with a cylindrical axis thereof extending horizontally. This cylindrical member is formed of a filtration media adapted to allow liquid to pass therethrough and contaminants to be retained therein. The cylindrical member is open at each end thereof to define an end inlet and an end outlet. This end inlet is in fluid flow communication with respect to the second inlet to receive pre-filtered liquid therefrom. Furthermore the end outlet includes a waste outlet to expel retained waste from the interior of cylindrical member.

To facilitate the movement of waste toward the waste outlet of the cylindrical member a plurality of baffle means may extend from the interior walls of the cylindrical member inwardly and are positioned to be spirally oriented to facilitate this movement of retained waste outwardly through the waste outlet.

A liquid reservoir is positioned immediately below the rotary filtration device and is adapted to receive filtered liquid from the second stage filtration device. The liquid reservoir may include a tank in fluid flow communication with respect to the second outlet to be adapted to receive and retain filtered liquid therefrom. A deflector plate is included extending obliquely into the tank means at a position below the filtered liquid outlet to allow filtered liquid to fall thereon prior to entering the tank therebelow. The deflector plate extends laterally across the tank and extends downwardly below the surface level of liquid retained therein to facilitate the localizing of foam and other floating materials.

A tank outlet is in fluid flow communication with respect to the tank and is adapted to allow filtered liquid to be removed from the tank as desired. Preferably the tank outlet is positioned within the tank remotely from the location of gathering of floating contaminants such as foam.

A liquid return line may be secured with respect to the tank outlet to re-supply filtered liquid for usage as desired. A pump may be operably secured with respect to the liquid return line to facilitate the removal of filtered liquid from the tank.

It is an object of the present invention to provide a two stage liquid filtration apparatus wherein relatively heavy and relatively small contaminants such as sand can be pre-filtered out in the first stage filtration.

It is an object of the present invention to provide a two stage liquid filtration apparatus wherein the size of the screening used in the pre-filtration step can be varied to alter the size and weight of contaminants prefiltered from liquid passing therethrough.

It is an object of the present invention to provide a two stage liquid filtration apparatus wherein overall initial capital outlay is minimized.

It is an object of the present invention to provide a two stage liquid filtration apparatus wherein high volume washing operations can be maintained at a high capacity level by the high speed continual filtration of the cleansing liquid used therein.

It is an object of the present invention to provide a two stage liquid filtration apparatus wherein maintenance costs are minimized.

It is an object of the present invention to provide a two stage liquid filtration apparatus wherein great financial savings is experienced due to the recirculation of filtered liquid.

It is an object of the present invention to provide a two stage liquid filtration apparatus wherein filtered liquid is temperature controlled prior to release back into the processing station.

It is an object of the present invention to provide a two stage liquid filtration apparatus wherein down time is eliminated by minimizing the number of moving parts.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
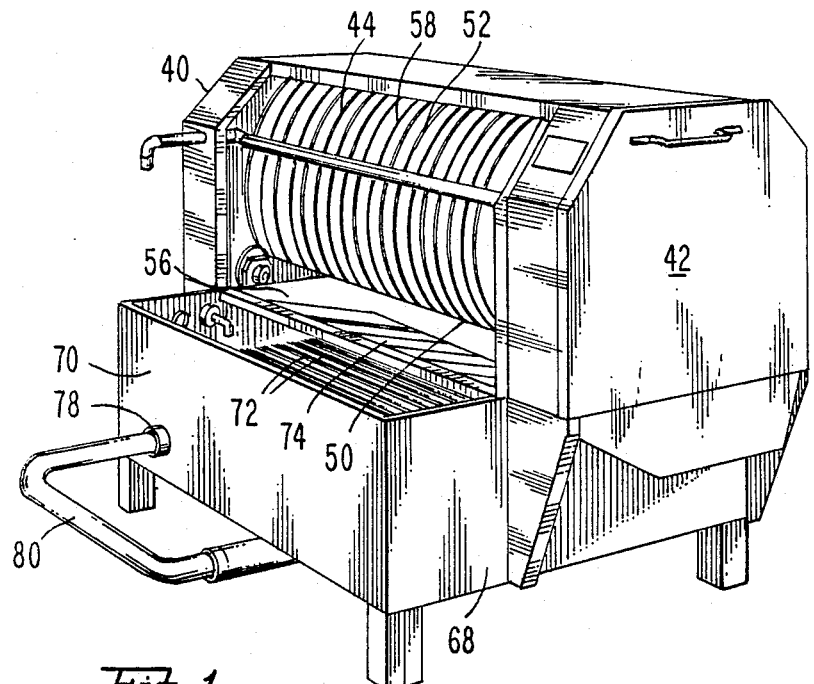
FIG. 1 is a perspective view of an embodiment of the second stage filtration means and liquid reservoir means of the present invention.
Figure 2:
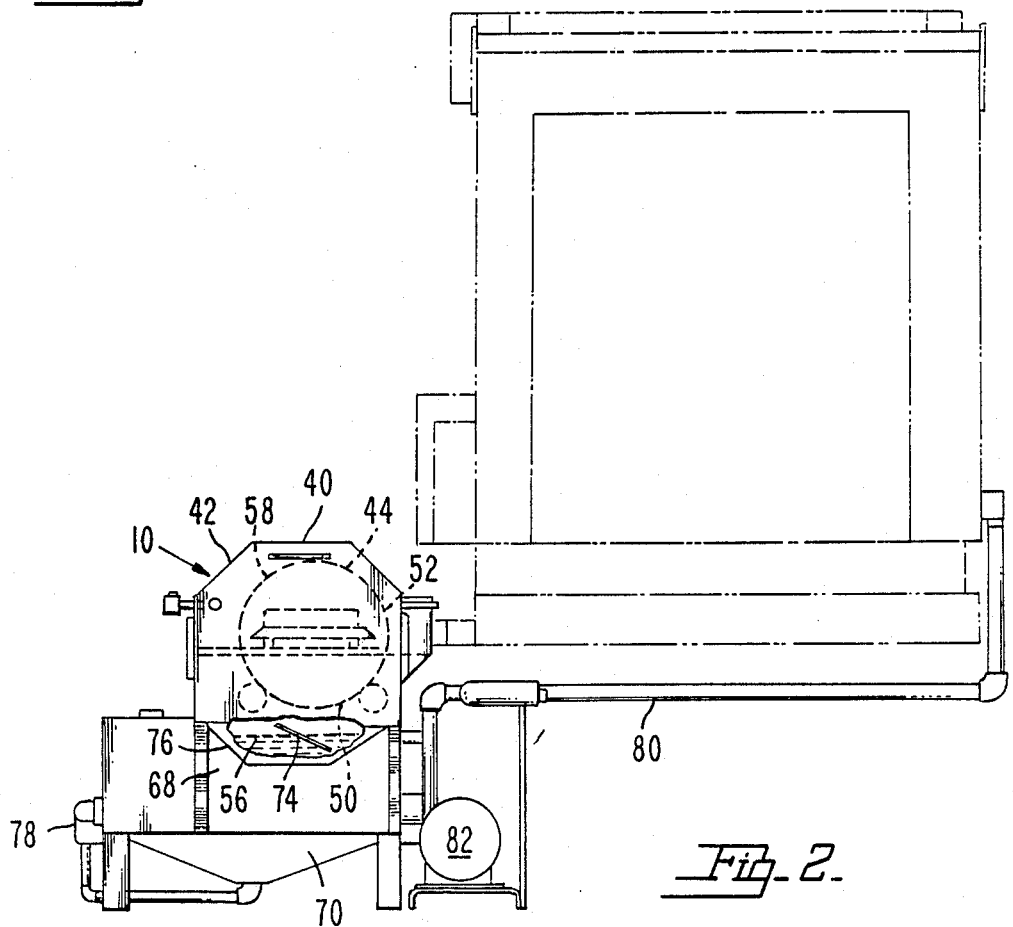
FIG. 2 is an end view of an embodiment of the two stage liquid filtration apparatus of the present invention.
Figure 3:
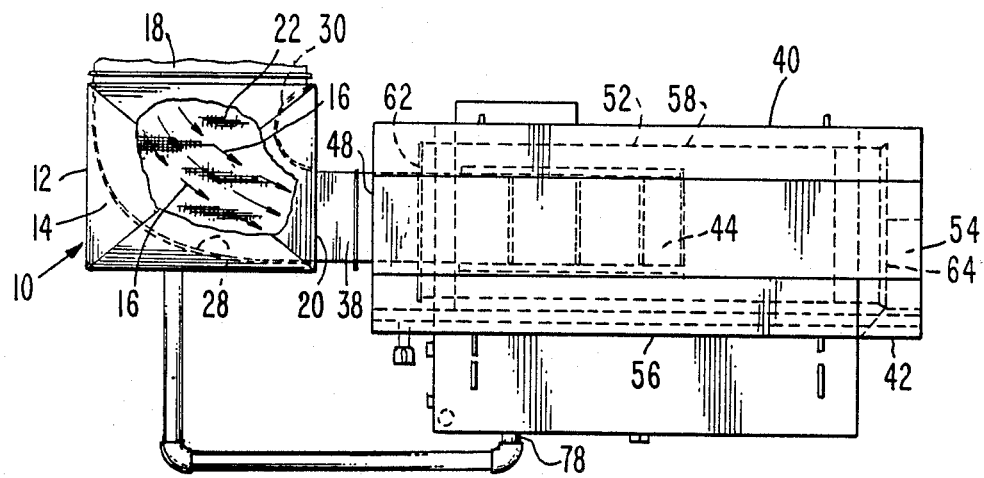
FIG. 3 is a top plan view of an embodiment of the two stage liquid filtration apparatus of the present invention.
Figure 4:
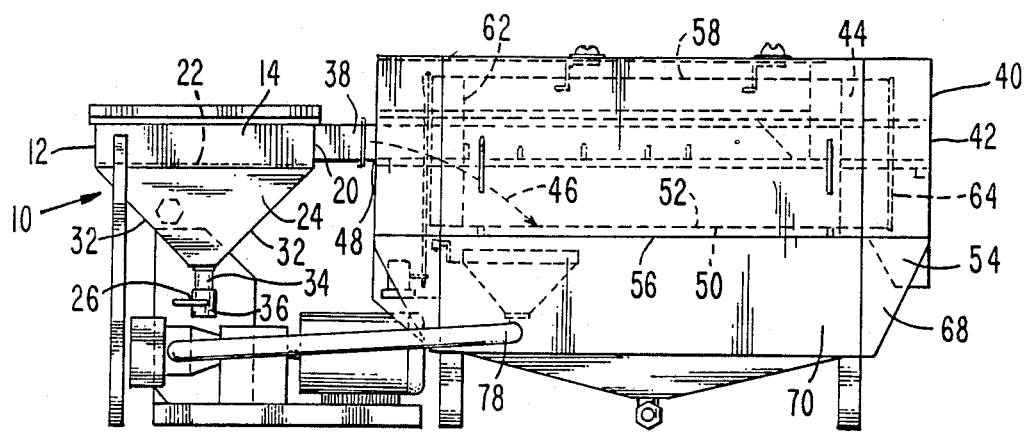
FIG. 4 is a side view of an embodiment of the two stage liquid filtration apparatus of the present invention.
Figure 5:
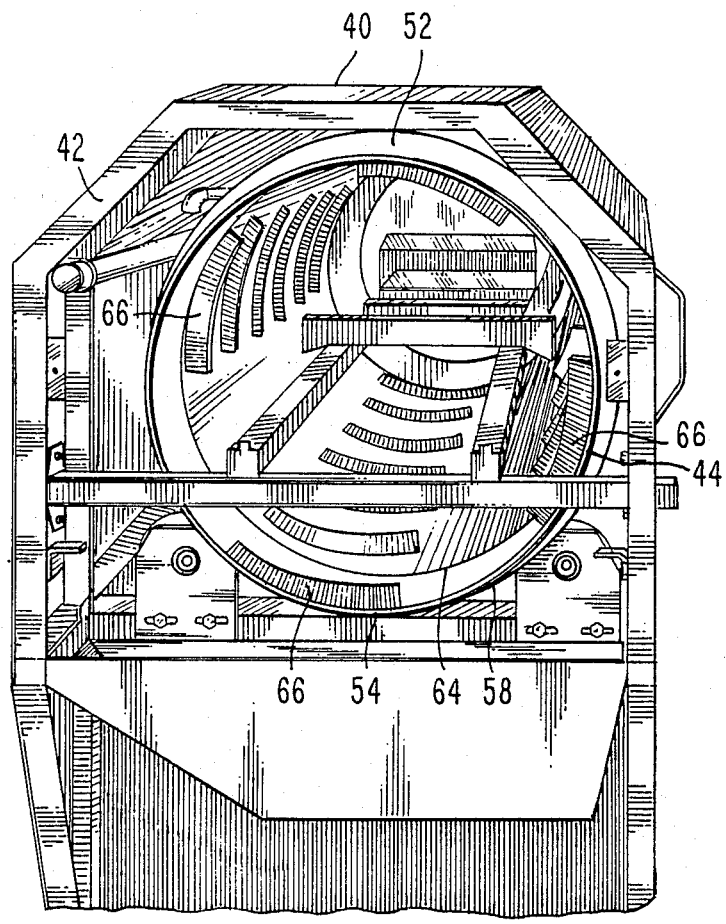
FIG. 5 is an end view of an embodiment of the second stage filtration apparatus of the present invention.
Figure 6:
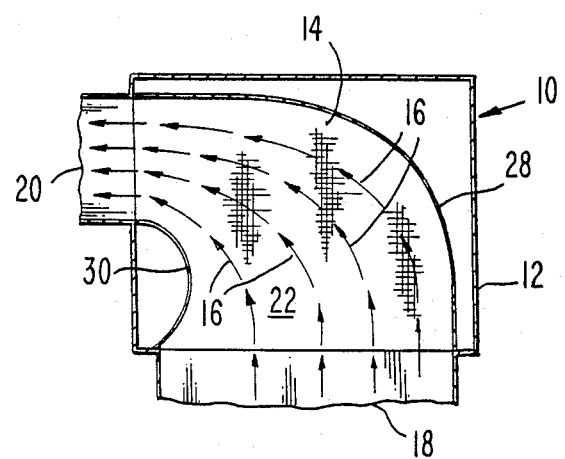
FIG. 6 is a top plan view of an embodiment of the first stage filtration device of the present invention.

The present invention provides a two stage liquid filtration apparatus including a first stage filtration means 10 including a first housing means 12 defining a first filtration chamber 14 therein. First housing means 12 defines a first inlet means 18 and a first outlet means 20 therein wherein liquid is adapted to pass through first inlet means 18 into first filtration chamber 14 and after pre-filtration thereof outwardly through first outlet means 20. As such there is continual fluid flow communication between first inlet means 18, first filtration chamber 14 and first outlet means 20. This continuous flow path is defined as first liquid flow path 16.

A screening means 22 such as a screen member or the like extends horizontally through the first filtration chamber 14 in order to define a lower retainment chamber 24 therebelow within the first filtration chamber 14. This lower retainment chamber 24 is adapted to receive heavy small contaminants from the liquid such as sand or the like. The particles passing into the lower retainment chamber 24 must pass through the screening means 22 and as such must be less than the hole size in the screen and must be heavy enough to fall downwardly from the liquid moving through the first liquid flow path 16. A second stage filtration means 40 is adapted to receive pre-filtered liquid from the first stage filtration means 10 and has been shown to be somewhat ineffective in the removal of sand-type particles from the liquid material. As such this pre-filtration step performed by the first stage filtration means 10 is effective in increasing the efficiency of operation of second stage filtration means 40.

A first waste outlet 26 is defined in the bottom area of the lower retainment chamber 24 and preferably is operatively secured with respect to a release valve 36. As such release valve 36 can be opened or closed as desired to release retained contaminants from the lower retainment chamber 24 for removal thereof downwardly through the first waste outlet 26. To facilitate movement of removed contaminants downwardly into contaminant retainment chamber 34 defined immediately above release valve 36 the lower retainment walls 32 will preferably be inclined downwardly and inwardly with respect to one another to urge the contaminants for movement downwardly as desired into the contaminant retainment chamber 34.

Preferably the first housing means 12 will define the first inlet 18 and the first outlet 20 with the axes thereof perpendicular with respect to one another. As such the first liquid flow path 16 will pass through a 90 degree angle as the liquid is moved from the first inlet 18 to the second inlet 20. This angular movement is aided by an arcuate outer guide plate 28 which is preferably concave and an arcuate inner guide plate 30 which is preferably convex. By causing of the liquid to pass through a 90 degree angle the speed of movement of the liquid can be somewhat slowed and the momentum of heavier particulate sand-like particles therein will tend to be downward to facilitate removal thereof into the lower retainment chamber 24.

An interstage conduit 38 is in fluid flow communication with respect to the first outlet 20 to carry pre-filtered liquid to the second stage filtration means 40. Second stage filtration means 40 includes a second housing 42 and a second filtration means 44. A second liquid flow path 46 defines the movement of liquid from being received from the interstage conduit 38 by the second inlet 48 to release after filtration thereof through the second outlet 50.

Preferably the second filtration means 44 will include a rotary filtration device 52. Preferably the rotary filtration device is defined as a cylindrical filtration member 58 which is rotatable about the axis thereof. The outer surface of the cylindrical member 58 will preferably be of a filtration media. Pre-filtered liquid will be adapted to enter into the interior of the cylindrical member 58 through an end inlet 62. Filtered liquid will then be allowed to pass through the cylindrical member 58 and contaminants will be retained therein for passage through the opposite end outlet 64. The rotary filtration means allows most of the liquid to pass outwardly therefrom after passing approximately halfway horizontally therealong. Movement of the contaminants will be facilitated by a spirally oriented baffle means 66 positioned along the interior walls of the cylindrical member 58. A waste outlet 54 will be positioned immediately adjacent the end outlet 64 of the cylindrical 58 to receive the retained contaminants therefrom for disposal thereof. The second housing means 42 will define a filtered liquid outlet 56 immediately below the cylindrical member for allowing filtered liquid to move downwardly therethrough.

Preferably a liquid reservoir 68 will be positioned immediately below the filtered liquid outlet 56 to receive filtered liquid therefrom. The liquid reservoir 68 will preferably include a tank means 70 of relatively large capacity on the order of 240 gallons. The tank means 70 may include a heating means 72 therein for heating of the liquid as desired for use within the processing station. A deflector plate 74 may be included at the upper portion of the tank 70 such as to be positioned extending completely across the tank and extending below the level 76 of filtered liquid therein. This deflector plate will be positioned immediately below the filtered liquid outlet 56 of second stage filtration means 40 in such a manner that all filtered liquid passing downwardly will contact the deflector plate and pass therealong for entry into the tank means 70 adjacent one wall thereof. In this manner the deflector plate 74 will be able to retain any remaining floating contaminants such as foam or the like in a localized area along one wall of the tank 70.

A tank outlet 78 will be defined by the liquid reservoir means 68 in fluid flow communication with respect to liquid retained within tank 70. Tank outlet 78 will be adapted to remove liquid ready for re-usage as desired. Preferably tank outlet 78 will be remotely located with respect to the area of localization of floating contaminants. A liquid return line 80 will be in fluid flow communication with respect to the tank outlet 78 and a pump means 82 may be operably secured with respect to the liquid return line to facilitate the movement of filtered liquid therethrough from tank 70.

The rotary filtration device and tank gathering means in the second filtration stage of the present invention has been shown to be particularly effective in the removal of contaminants from liquid especially used for various cleansing purposes such as cleaning poultry cages, eggs or trays, with the exception of sand removal. Sand tends to pass outwardly through the rotary filtration means and pass into the tank means. Therefore the present invention combines a pre-filtration step for removing of sand in combination with the efficient rotary filtration step to provide an overall filtration system which has been found to be extremely efficient for usages as desired.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A two stage liquid filtration apparatus comprising:
(a) a first stage filtration means adapted to prefilter heavier particulate contaminants from liquid, said first stage filtration means including:
  (1) a first housing means defining a first filtration chamber therein adapted to retain heavier particulate contaminants, said first housing means defining a first liquid flow path extending therethrough;
  (2) a first inlet means in said first housing means being in fluid flow communication with respect to said first liquid flow path, said first inlet means being adapted to receive liquid therethrough for movement into said first liquid flow path for pre-filtration thereof;
  (3) a first outlet means in said first housing means being in fluid flow communication with respect to said first liquid flow path and adapted to receive pre-filtered liquid therefrom for exiting thereof from said first filtration means;
  (4) a screening means extending laterally through said first filtration chamber to define said liquid flow path thereabove and to define a lower retainment chamber therebelow, said screening means allowing limited fluid flow communication between said liquid flow path and said lower retainment chamber to allow heavier particulate contaminants below a predetermined size and above a predetermined weight to pass therethrough and be removed from the liquid in said first liquid flow path to be retained within said lower retainment chamber therebelow;
  (5) a first waste outlet in fluid flow communication with respect to said lower retainment chamber, said first waste outlet being selectively openable to periodically release retained particulate contaminants therefrom as desired;
(b) an interstage conduit in fluid flow communication with respect to said first outlet means and being adapted to receive pre-filtered liquid therefrom;
(c) a second stage filtration means adapted to receive pre-filtered liquid from said interstage conduit and remove contaminants therefrom, said second stage filtration means comprising:
  (1) a second housing means defining a second filtration chamber therein adapted to further remove contaminants from the pre-filtered liquid, said second housing means defining a second liquid flow path therethrough;
  (2) a second inlet means in fluid flow communication with respect to said interstage conduit to receive pre-filter liquid therefrom;

(3) a second outlet means in fluid flow communication with respect to said second liquid flow path to exit filtered liquid from said second filtration chamber;

(4) a rotary filtration means in fluid flow communication with respect to said second inlet means to receive pre-filtered liquid therefrom for further filtration, said rotary filtration means defining a waste outlet and a filtered liquid outlet, said filtered liquid outlet being in fluid flow communication with respect to said second outlet means;

(d) a liquid reservoir means adapted to receive filtered liquid from said second stage filtration means, said liquid reservoir means including:

(1) a tank means in fluid flow communication with respect to said second outlet means and adapted to receive and retain filtered liquid therefrom;

(2) a heating means positioned within said tank means and being adapted to control the temperature of the liquid retained therein; and (3) a tank outlet in fluid flow communication with respect to said tank means and adapted to allow filtered liquid to be removed from said tank means as desired.

2. A two stage liquid filtration apparatus as defined in claim 1 wherein said rotary filtration means comprises:

(a) a rotary filtration member comprising a generally cylindrical member oriented with the cylindrical axis thereof extending horizontally and being rotatable thereabout, said cylindrical member being formed of a filtration media adapted to allow liquid to pass therethrough and contaminants to be retained therein, said cylindrical member being open at each end thereof to define an end inlet and an end outlet, said end inlet being in fluid flow communication with respect to said second inlet means to receive pre-filtered liquid therefrom, said end outlet comprising said waste outlet to expel retained waste from the interior of said cylindrical member; and (b) a plurality of baffle means extending from the interior walls of said cylindrical member inwardly and being spirally oriented to facilitate urging of retained waste toward said waste outlet.

3. A two stage liquid filtration apparatus as defined in claim 1 wherein said liquid reservoir means includes a deflector plate extending obliquely into said tank means at a position below said filtered liquid outlet to allow filtered liquid to fall thereon prior to entering said tank means therebelow, said deflector plate extending laterally across said tank means and extending downwardly below the surface level of liquid retained, therein to define an area for localizing of foam and other contaminants.

4. A two stage liquid filtration apparatus as defined in claim 3 wherein said tank outlet is positioned remotely with respect to the area of localizing of foam and other contaminants to maximize the filtration of liquid being supplied thereto.

5. A two stage liquid filtration apparatus as defined in claim 1 wherein said first inlet means and said first outlet means are oriented perpendicular with respect to one another, such that said first liquid flow path extends through a 90 degree angle turn as liquid passes therebetween.

6. A two stage liquid filtration apparatus as defined in claim 5 wherein said first stage filtration means includes an arcuate outer guide plate which is concave and an arcuate inner guide plate which is convex to facilitate guiding of said first liquid flow path through a 90 degree angle turn therethrough.

7. A two sage liquid filtration apparatus as defined in claim 1 further including a liquid return line in fluid flow communication with respect to said tank outlet to resupply supply filtered liquid for usage thereof as desired.

8. A two stage liquid filtration apparatus as defined in claim 7 further including a pump means in fluid flow communication with respect to said liquid return line for pumping of filtered liquid therethrough as desired.

9. A two stage liquid filtration apparatus as defined in claim 1 wherein said first housing means includes lower retainment walls inclined inwardly with respect to one another to define a contaminant retainment chamber therebetween.

10. A two stage liquid filtration apparatus as defined in claim 9 wherein said first waste outlet includes a release valve located immediately below said contaminant retainment chamber to facilitate selective periodic release of retained contaminants therefrom as desired.

11. A two stage liquid filtration apparatus as defined in claim 1 wherein said screening means comprises a horizontally extending screen member adapted to sift out smaller diameter heavier contaminants.

12. A two stage liquid filtration apparatus as defined in claim 1 wherein said liquid reservoir means is positioned immediately below said rotary filtration means to facilitate flow of filtered liquid thereto.

13. A two stage liquid filtration apparatus as defined in claim 1 wherein said tank means has a volume of approximately 240 gallons.

14. A two stage liquid filtration apparatus comprising:

(a) a first stage filtration means adapted to prefilter heavier particulate contaminants from liquid, said first stage filtration means including:

(1) a first housing means defining a first filtration chamber therein adapted to retain heavier particulate contaminants, said first housing means defining a first liquid flow path extending therethrough, said first housing means including an arcuate outer guide plate which is concave and an arcuate inner guide plate which is convex to facilitate guiding of liquid along said first liquid flow path, said first housing means including lower retainment walls inclined inwardly with respect to one another to define a contaminant retainment chamber therebetween;

(2) a first inlet means in said first housing means being in fluid flow communication with respect to said first liquid flow path, said first inlet means being adapted to receive liquid therethrough for movement into said first liquid flow path for pre-filtration thereof;

(3) a first outlet means in said first housing means being in fluid flow communication with respect to said first liquid flow path and adapted to receive pre-filtered liquid therefrom for exiting thereof from said first filtration means, said first outlet means being oriented perpendicularly with respect to said first inlet means with said first liquid flow path passing through a 90 degree angle;

(4) a screening means comprising a horizontally extending screen member extending laterally through said first filtration chamber to define said liquid flow path thereabove and to define a lower retainment chamber therebelow, said screening means allowing limited fluid flow communication between said liquid flow path and said lower retainment chamber to allow heavier particulate contaminants below a predetermined size and above a predetermined weight to pass therethrough and be removed from the liquids in said first liquid flow path to be retained within said lower retainment chamber therebelow;

(5) a first waste outlet in fluid flow communication with respect to said lower retainment chamber, said first waste outlet being selectively openable to periodically release retained particulate contaminants from said contaminant retainment chamber as desired;

(6) a release valve located immediately below said contaminant retainment chamber to facilitate selective periodic release of retained contaminants therefrom as desired;

(b) an interstage conduit in fluid flow communication with respect to said first outlet means and being adapted to receive pre-filtered liquid therefrom;

(c) a second stage filtration means adapted to receive pre-filtered liquid from said interstage conduit and remove contaminants therefrom, said second stage filtration means comprising:

(1) a second housing means defining a second filtration chamber therein adapted to further remove contaminants from the pre-filtered liquid, said second housing means defining a second liquid flow path therethrough;

(2) a second inlet means in fluid flow communication with respect to said interstage conduit to receive pre-filter liquid therefrom;

(3) a second outlet means in fluid flow communication with respect to said second liquid flow path to exit filtered liquid from said second filtration chamber;

(4) a rotary filtration means in fluid flow communication with respect to said second inlet means to receive pre-filtered liquid therefrom for further filtration, said rotary filtration means defining a waste outlet and a filtered liquid outlet, said filtered liquid outlet being in fluid flow communication with respect to said second outlet means, said rotary filtration means including:

(i) a generally cylindrical member oriented with the cylindrical axis thereof extending horizontally and being rotatable thereabout, said cylindrical member being formed of a filtration media adapted to allow liquid to pass therethrough and contaminants to be retained therein, said cylindrical member being open at each end thereof to define an end inlet and an end outlet, said end inlet being in fluid flow communication with respect to said second inlet means to receive prefiltered liquid therefrom, said end outlet comprising said waste outlet to expel retained waste from the interior of said cylindrical member;

(ii) a plurality of baffle means extending from the interior walls of said cylindrical member inwardly and being spirally oriented with respect to the interior walls of said cylindrical member to facilitate movement of retained waste toward said waste outlet;

(d) a liquid reservoir means positioned immediately below said rotary filtration means and adapted to receive filtered liquid from said second stage filtration means, said liquid reservoir means including:

(1) a tank means in fluid flow communication with respect to said second outlet means and adapted to receive and retain filtered liquid therefrom;

(2) a heating means positioned within said tank means and being adapted to control the temperature of the liquid retained therein;

(3) a deflector plate extending obliquely into said tank means at a position below said filtered liquid outlet to allow filtered liquid to fall thereon prior to entering said tank means therebelow, said deflector plate extending laterally across said tank means and extending downwardly below the surface level of liquid retained therein to define an area for the localizing of foam and other contaminants;

(4) a tank outlet in fluid flow communication with respect to said tank means and adapted to allow filtered liquid to be removed from said tank means as desired, said tank outlet being positioned remotely with respect to the area of localizing of foam and other contaminants to maximize the filtration of liquid being supplied thereto;

(5) a liquid return line in fluid flow communication with respect to said tank outlet to re-supply filtered liquid for usage thereof as desired; and (6) a pump means in fluid flow communication with respect to said liquid return line for pumping of filtered liquid therethrough as desired.

* * * * *